United States Patent
Fang et al.

(10) Patent No.: US 11,694,312 B2
(45) Date of Patent: Jul. 4, 2023

(54) IMAGE ENHANCEMENT FOR MULTI-LAYERED STRUCTURE IN CHARGED-PARTICLE BEAM INSPECTION

(71) Applicant: ASML Netherlands B.V., Veldhoven (NL)

(72) Inventors: Wei Fang, Milpitas, CA (US); Ruochong Fei, San Jose, CA (US); Lingling Pu, San Jose, CA (US); Wentian Zhou, San Jose, CA (US); Liangjiang Yu, Pleasanton, CA (US); Bo Wang, Cupertino, CA (US)

(73) Assignee: ASML Netherlands B.V., Veldhoven (NL)

( * ) Notice: Subject to any disclaimer, the term of this patent is extended or adjusted under 35 U.S.C. 154(b) by 227 days.

(21) Appl. No.: 17/308,835

(22) Filed: May 5, 2021

(65) Prior Publication Data
US 2021/0350507 A1      Nov. 11, 2021

Related U.S. Application Data

(60) Provisional application No. 63/022,170, filed on May 8, 2020.

(51) Int. Cl.
*G06T 5/00*     (2006.01)
*G06T 7/10*     (2017.01)
*G06T 5/50*     (2006.01)

(52) U.S. Cl.
CPC .............. *G06T 5/003* (2013.01); *G06T 5/50* (2013.01); *G06T 7/10* (2017.01);
(Continued)

(58) Field of Classification Search
CPC .. G06T 5/003; G06T 5/50; G06T 7/10; G06T 2207/10061; G06T 2207/20201; G06T 2207/30148
See application file for complete search history.

(56) References Cited

U.S. PATENT DOCUMENTS

| | | | |
|---|---|---|---|
| 2004/0069956 A1* | 4/2004 | Takane | G06T 5/003 250/307 |
| 2007/0187571 A1* | 8/2007 | Ebe | G02B 7/36 250/201.2 |

(Continued)

FOREIGN PATENT DOCUMENTS

| | | |
|---|---|---|
| CN | 102292676 A | 12/2011 |
| JP | 4483039 B2 * | 6/2010 |

(Continued)

OTHER PUBLICATIONS

Office Action of the Intellectual Property Office issued in related Taiwanese Patent Application No. 110115250, dated Feb. 16, 2022 (16 pgs.).

*Primary Examiner* — Sean T Motsinger
(74) *Attorney, Agent, or Firm* — Finnegan, Henderson, Farabow, Garrett & Dunner, LLP

(57) ABSTRACT

An improved method and apparatus for enhancing an inspection image in a charged-particle beam inspection system. An improved method for enhancing an inspection image comprises acquiring a first image and a second image of multiple stacked layers of a sample that are taken with a first focal point and a second focal point, respectively, associating a first segment of the first image with a first layer among the multiple stacked layers and associating a second segment of the second image with a second layer among the multiple stacked layers, updating the first segment based on a first reference image corresponding to the first layer and updating the second segment based on a second reference image corresponding to the second layer, and combining the updated first segment and the updated second segment to generate a combined image including the first layer and the second layer.

15 Claims, 9 Drawing Sheets

(52) U.S. Cl.
CPC ............... *G06T 2207/10061* (2013.01); *G06T 2207/20201* (2013.01); *G06T 2207/30148* (2013.01)

(56) References Cited

U.S. PATENT DOCUMENTS

| | | | |
|---|---|---|---|
| 2008/0089617 A1* | 4/2008 | Kutscher | G01N 21/9501 382/312 |
| 2009/0196489 A1* | 8/2009 | Le | G01N 21/9503 382/148 |
| 2012/0164763 A1* | 6/2012 | Fukazawa | G03F 7/70641 356/369 |
| 2014/0092231 A1* | 4/2014 | Nakahira | H01J 37/28 348/80 |
| 2017/0148226 A1 | 5/2017 | Zhang et al. | |
| 2021/0350507 A1* | 11/2021 | Fang | G06T 5/20 |

FOREIGN PATENT DOCUMENTS

| | | |
|---|---|---|
| TW | 201830006 A | 8/2018 |
| TW | 201937553 A | 9/2019 |
| TW | 201940985 A | 10/2019 |

\* cited by examiner

500

501                  502

501

IMAGE ENHANCEMENT FOR MULTI-LAYERED STRUCTURE IN CHARGED-PARTICLE BEAM INSPECTION

CROSS-REFERENCE TO RELATED APPLICATIONS

This application claims priority of U.S. application 63/022,170 which was filed on May 8, 2020 and which is incorporated herein in its entirety by reference.

TECHNICAL FIELD

The embodiments provided herein relate to an image enhancement technology, and more particularly to inspection image enhancement for a multi-layered structure on a wafer in charged-particle beam inspection.

BACKGROUND

In manufacturing processes of integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM) can be employed. As the physical sizes of IC components continue to shrink, accuracy and yield in defect detection become more important.

Pattern/structure displacements and dimension deviations from designs can be measured from a SEM image with sub-nanometer (nm) precision. These measurements can be helpful in identifying defects of manufactured ICs and in controlling manufacturing processes. Three dimensional structures, such as staircase structures, are widely used and the height of three dimensional structures grows taller and taller in order to increase density or storage capacity of chips. Therefore, robust inspection or accurate metrology measurement for the three dimensional structures are needed.

SUMMARY

The embodiments provided herein disclose a particle beam inspection apparatus, and more particularly, an inspection apparatus using a charged particle beam.

In some embodiments, a method for enhancing an inspection image in a charged-particle beam inspection system is provided. The method comprises acquiring a first image and a second image of multiple stacked layers of a sample that are taken with a first focal point and a second focal point, respectively, associating a first segment of the first image with a first layer among the multiple stacked layers and associating a second segment of the second image with a second layer among the multiple stacked layers, estimating a first blurriness degree of the first segment based on a first reference image corresponding to the first layer and estimating a second blurriness degree of the second segment based on a second reference image, updating the first segment according to the first blurriness degree and updating the second segment according to the second blurriness degree, and combining the updated first segment and the updated second segment to generate a combined image including the first layer and the second layer.

In some embodiments, an image enhancing apparatus comprises a memory storing a set of instructions and at least one processor configured to execute the set of instructions to cause the apparatus to perform acquiring a first image and a second image of multiple stacked layers of a sample that are taken with a first focal point and a second focal point, respectively, associating a first segment of the first image with a first layer among the multiple stacked layers and associating a second segment of the second image with a second layer among the multiple stacked layers, estimating a first blurriness degree of the first segment based on a first reference image corresponding to the first layer and estimating a second blurriness degree of the second segment based on a second reference image, updating the first segment according to the first blurriness degree and updating the second segment according to the second blurriness degree, and combining the updated first segment and the updated second segment to generate a combined image including the first layer and the second layer.

In some embodiments, a non-transitory computer readable medium that stores a set of instructions that is executable by at least one processor of a computing device to perform a method for enhancing an image is provided. The method comprises acquiring a first image and a second image of multiple stacked layers of a sample that are taken with a first focal point and a second focal point, respectively, associating a first segment of the first image with a first layer among the multiple stacked layers and associating a second segment of the second image with a second layer among the multiple stacked layers, estimating a first blurriness degree of the first segment based on a first reference image corresponding to the first layer and estimating a second blurriness degree of the second segment based on a second reference image, updating the first segment according to the first blurriness degree and updating the second segment according to the second blurriness degree, and combining the updated first segment and the updated second segment to generate a combined image including the first layer and the second layer.

In some embodiments, a method for enhancing an inspection image in a charged-particle beam inspection system is provided. The method comprises acquiring a first image and a second image of multiple stacked layers of a sample that are taken with a first focal point and a second focal point, respectively, associating a first segment of the first image with a first layer among the multiple stacked layers and associating a second segment of the second image with a second layer among the multiple stacked layers, updating the first segment based on a first reference image corresponding to the first layer and updating the second segment based on a second reference image corresponding to the second layer, and combining the updated first segment and the updated second segment to generate a combined image including the first layer and the second layer.

In some embodiments, a method for generating an image of a sample is provided. The method comprises obtaining multiple images of a location on the sample, each of the multiple images being obtained at a different focal point, determining correlations between features of the multiple images and features of an associated reference image, determining a depth of each of the features of the multiple images based on the correlations and layer information of the associated reference image, selecting one image of the multiple images from which to obtain a selected image for each of the features on the multiple images, and creating an image of the location by combining each of the selected image.

Other advantages of the embodiments of the present disclosure will become apparent from the following description taken in conjunction with the accompanying drawings wherein are set forth, by way of illustration and example, certain embodiments of the present invention.

DETAILED DESCRIPTION

Figure 1:
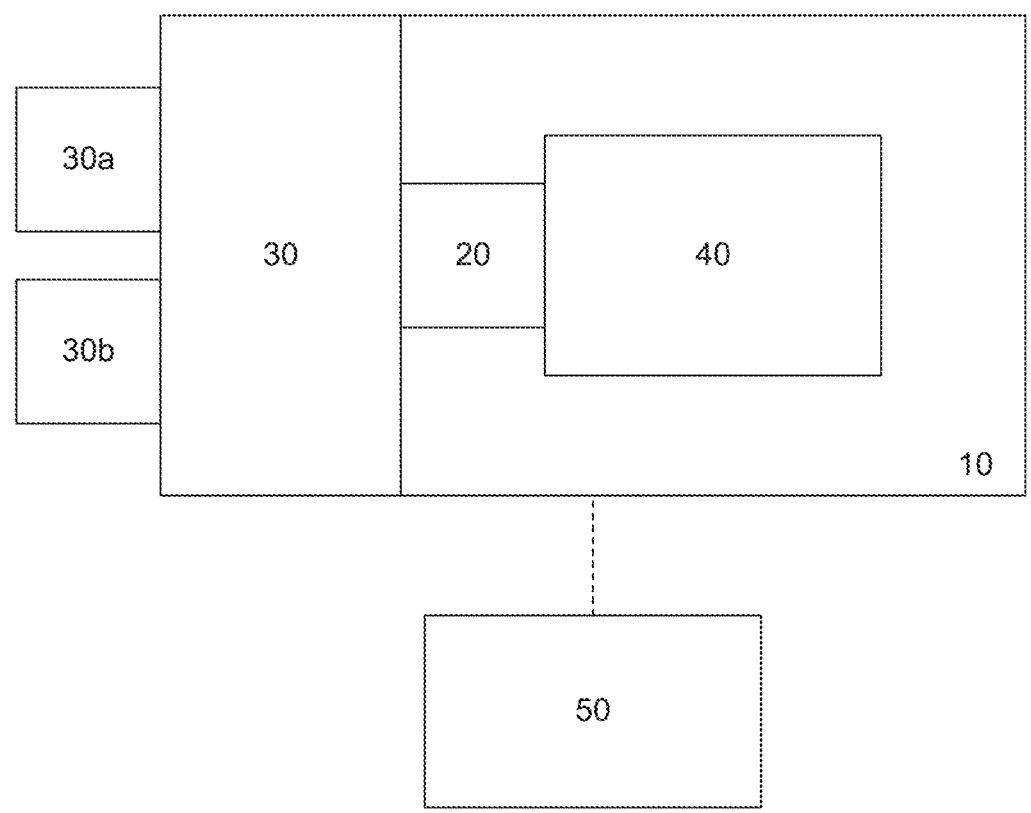
FIG. 1 is a schematic diagram illustrating an example electron beam inspection (EBI) system, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims. For example, although some embodiments are described in the context of utilizing electron beams, the disclosure is not so limited. Other types of charged particle beams may be similarly applied. Furthermore, other imaging systems may be used, such as optical imaging, photo detection, x-ray detection, etc.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than 1/1000th the size of a human hair.

Making these extremely small ICs is a complex, time-consuming, and expensive process, often involving hundreds of individual steps. Errors in even one step have the potential to result in defects in the finished IC rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection can be carried out using a scanning electron microscope (SEM). A SEM can be used to image these extremely small structures, in effect, taking a "picture" of the structures. The image can be used to determine if the structure was formed properly and also if it was formed in the proper location. If the structure is defective, then the process can be adjusted so the defect is less likely to recur.

Pattern/structure displacements and dimension deviations from designs can be measured from a SEM image with sub-nanometer (nm) precision. These measurements can be helpful in identifying defects of manufactured ICs and in controlling manufacturing processes. Because of a limited focus depth of an inspection tool, it is difficult to obtain in-focus inspection images for three dimensional structures. However, the height of three dimensional structures, such as staircase structures, grows taller and taller in order to increase density or storage capacity of chips, which prohibits robust inspection or metrology measurement for the three dimensional structures.

Some embodiments of the present disclosure provide a technique for obtaining an in-focus inspection image for a multi-layered structure of which depth is greater than a focus depth of an inspection system. In some embodiments, a plurality of inspection images taken for a multi-layered structure with different focal points can be compensated on a per layer basis based on corresponding Graphic Database System (GDS) information and can be combined to generate a clearer inspection image for the multi-layered structure within a field of view. The present disclosure can help in providing a more accurate SEM image and thus enables detecting defects of a sample with higher accuracy and efficiency.

Relative dimensions of components in drawings may be exaggerated for clarity. Within the following description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Reference is now made to FIG. 1, which illustrates an example electron beam inspection (EBI) system 100 consistent with embodiments of the present disclosure. As shown in FIG. 1, charged particle beam inspection system 100 includes a main chamber 10, a load-lock chamber 20, an electron beam tool 40, and an equipment front end module (EFEM) 30. Electron beam tool 40 is located within main chamber 10. While the description and drawings are directed to an electron beam, it is appreciated that the embodiments are not used to limit the present disclosure to specific charged particles.

EFEM 30 includes a first loading port 30a and a second loading port 30b. EFEM 30 may include additional loading port(s). First loading port 30a and second loading port 30b receive wafer front opening unified pods (FOUPs) that contain wafers (e.g., semiconductor wafers or wafers made of other material(s)) or samples to be inspected (wafers and samples are collectively referred to as "wafers" hereafter). One or more robot arms (not shown) in EFEM 30 transport the wafers to load-lock chamber 20.

Load-lock chamber 20 is connected to a load/lock vacuum pump system (not shown), which removes gas molecules in load-lock chamber 20 to reach a first pressure below the atmospheric pressure. After reaching the first pressure, one or more robot arms (not shown) transport the wafer from load-lock chamber 20 to main chamber 10. Main chamber 10 is connected to a main chamber vacuum pump system (not shown), which removes gas molecules in main chamber 10 to reach a second pressure below the first pressure. After reaching the second pressure, the wafer is subject to inspection by electron beam tool 40. In some embodiments, electron beam tool 40 may comprise a single-beam inspection tool. In other embodiments, electron beam tool 40 may comprise a multi-beam inspection tool.

Controller 50 may be electronically connected to electron beam tool 40 and may be electronically connected to other components as well. Controller 50 may be a computer configured to execute various controls of charged particle beam inspection system 100. Controller 50 may also include processing circuitry configured to execute various signal and image processing functions. While controller 50 is shown in FIG. 1 as being outside of the structure that includes main chamber 10, load-lock chamber 20, and EFEM 30, it is appreciated that controller 50 can be part of the structure.

While the present disclosure provides examples of main chamber 10 housing an electron beam inspection system, it should be noted that aspects of the disclosure in their broadest sense, are not limited to a chamber housing an electron beam inspection system. Rather, it is appreciated that the foregoing principles may be applied to other chambers as well.

Figure 2:
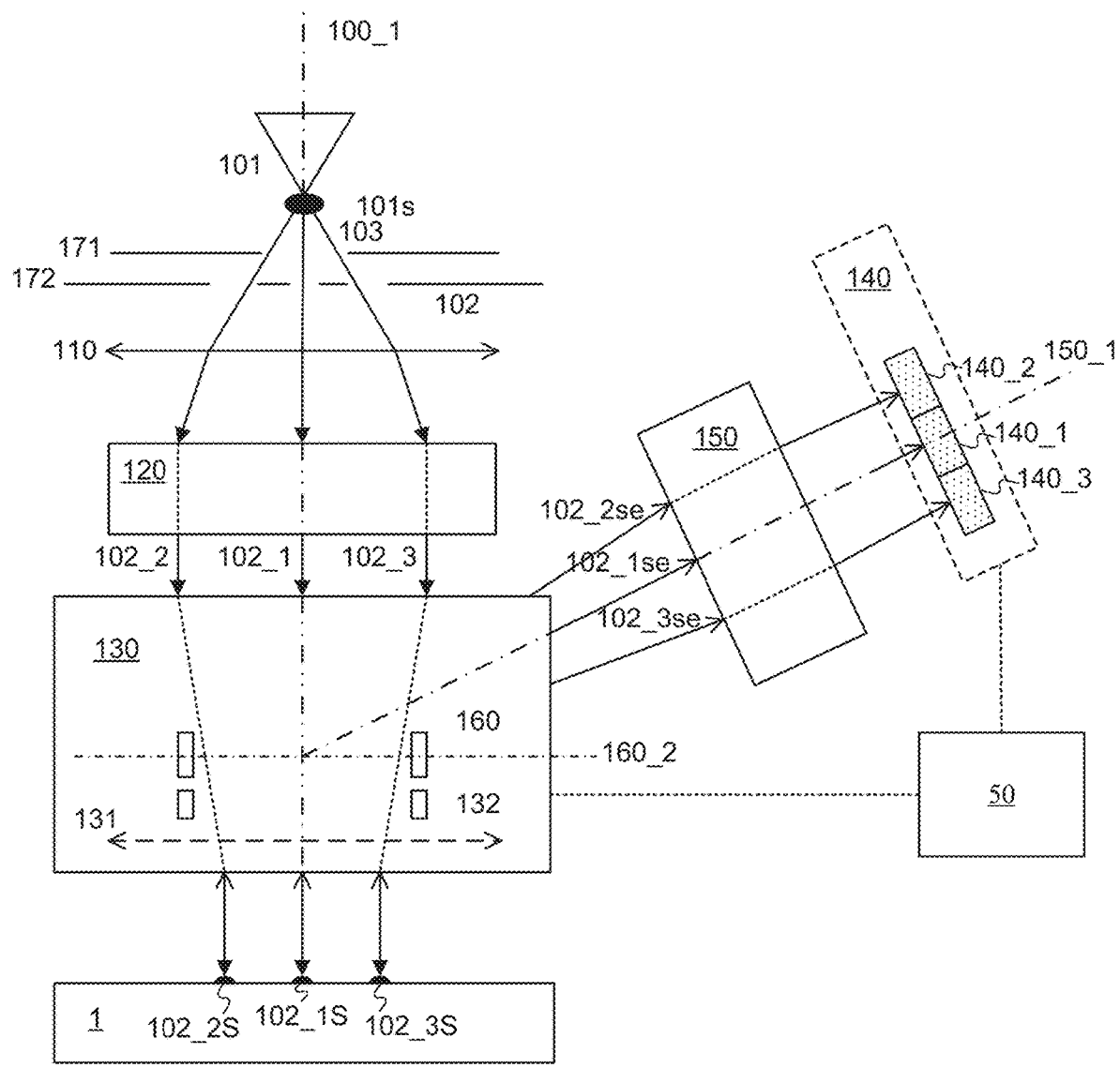
FIG. 2 is a schematic diagram illustrating an example electron beam tool that can be a part of the electron beam inspection system of FIG. 1, consistent with some embodiments of the present disclosure.

Reference is now made to FIG. 2, which illustrates a schematic diagram illustrating an example electron beam tool 40 that can be a part of the example charged particle beam inspection system 100 of FIG. 1, consistent with embodiments of the present disclosure. An electron beam tool 40 (also referred to herein as apparatus 40) comprises an electron source 101, a gun aperture plate 171 with a gun aperture 103, a pre-beamlet forming mechanism 172, a condenser lens 110, a source conversion unit 120, a primary projection optical system 130, a sample stage (not shown in FIG. 2), a secondary imaging system 150, and an electron detection device 140. Primary projection optical system 130 can comprise an objective lens 131. Electron detection device 140 can comprise a plurality of detection elements 140_1, 140_2, and 140_3. Beam separator 160 and deflection scanning unit 132 can be placed inside primary projection optical system 130. It may be appreciated that other commonly known components of apparatus 40 may be added/omitted as appropriate.

Electron source 101, gun aperture plate 171, condenser lens 110, source conversion unit 120, beam separator 160, deflection scanning unit 132, and primary projection optical system 130 can be aligned with a primary optical axis 100_1 of apparatus 100. Secondary imaging system 150 and electron detection device 140 can be aligned with a secondary optical axis 150_1 of apparatus 40.

Electron source 101 can comprise a cathode, an extractor or an anode, wherein primary electrons can be emitted from the cathode and extracted or accelerated to form a primary electron beam 102 that forms a crossover (virtual or real) 101s. Primary electron beam 102 can be visualized as being emitted from crossover 101s.

Source conversion unit 120 may comprise an image-forming element array (not shown in FIG. 2), an aberration compensator array (not shown), a beam-limit aperture array (not shown), and a pre-bending micro-deflector array (not shown). The image-forming element array can comprise a plurality of micro-deflectors or micro-lenses to form a plurality of parallel images (virtual or real) of crossover 101s with a plurality of beamlets of primary electron beam 102. FIG. 2 shows three beamlets 102_1, 102_2, and 102_3 as an example, and it is appreciated that the source conversion unit 120 can handle any number of beamlets. Controller 50 may be connected to various parts of charged particle beam inspection system 100 of FIG. 1, such as electron detection device 140, primary projection optical system 130, etc. In some embodiments, as explained in further details below, controller 50 may perform various image and signal processing functions. Controller 50 may also generate various control signals to govern operations of charged particle beam inspection system 100.

In some embodiments, source conversion unit 120 may be provided with beam-limit aperture array and image-forming element array (both are not shown). The beam-limit aperture array may comprise beam-limit apertures. It is appreciated that any number of apertures may be used, as appropriate. Beam-limit apertures may be configured to limit sizes of beamlets 102_1, 102_2, and 102_3 of primary-electron beam 102. The image-forming element array may comprise image-forming deflectors (not shown) configured to deflect beamlets 102_1, 102_2, and 102_3 by varying angles towards primary optical axis 100_1. In some embodiments, deflectors further away from primary optical axis 100_1 may deflect beamlets to a greater extent. Furthermore, image-forming element array may comprise multiple layers (not illustrated), and deflectors may be provided in separate layers. Deflectors may be configured to be individually controlled independent from one another. In some embodiments, a deflector may be controlled to adjust a pitch of probe spots (e.g., 102_1S, 102_2S, and 102_3S) formed on a surface of sample 1. As referred to herein, pitch of the probe spots may be defined as the distance between two immediately adjacent probe spots on the surface of sample 1.

A centrally located deflector of image-forming element array may be aligned with primary optical axis 100_1 of electron beam tool 40. Thus, in some embodiments, a central deflector may be configured to maintain the trajectory of beamlet 102_1 to be straight. In some embodiments, the central deflector may be omitted. However, in some embodiments, primary electron source 101 may not necessarily be aligned with the center of source conversion unit 120. Furthermore, it is appreciated that while FIG. 2 shows a side view of apparatus 40 where beamlet 102_1 is on primary optical axis 100_1, beamlet 102_1 may be off primary optical axis 100_1 when viewed from a different side. That is, in some embodiments, all of beamlets 102_1, 102_2, and 102_3 may be off-axis. An off-axis component may be offset relative to primary optical axis 100_1.

The deflection angles of the deflected beamlets may be set based on one or more criteria. In some embodiments, deflectors may deflect off-axis beamlets radially outward or away (not illustrated) from primary optical axis 100_1. In some embodiments, deflectors may be configured to deflect off-axis beamlets radially inward or towards primary optical axis 100_1. Deflection angles of the beamlets may be set so that beamlets 102_1, 102_2, and 102_3 land perpendicularly on sample 1. Off-axis aberrations of images due to lenses, such as objective lens 131, may be reduced by adjusting paths of the beamlets passing through the lenses. Therefore, deflection angles of off-axis beamlets 102_2 and 102_3 may be set so that probe spots 102_2S and 102_3S have small aberrations. Beamlets may be deflected so as to pass through or close to the front focal point of objective lens 131 to decrease aberrations of off-axis probe spots 102_2S and 102_3S. In some embodiments, deflectors may be set to make beamlets 102_1, 102_2, and 102_3 land perpendicularly on sample 1 while probe spots 102_1S, 102_2S, and 102_3S have small aberrations.

Condenser lens 110 is configured to focus primary electron beam 102. The electric currents of beamlets 102_1, 102_2, and 102_3 downstream of source conversion unit 120 can be varied by adjusting the focusing power of condenser lens 110 or by changing the radial sizes of the corresponding beam-limit apertures within the beam-limit aperture array. The electric currents may be changed by both, altering the radial sizes of beam-limit apertures and the focusing power of condenser lens 110. Condenser lens 110 may be an adjustable condenser lens that may be configured so that the position of its first principle plane is movable. The adjustable condenser lens may be configured to be magnetic, which may result in off-axis beamlets 102_2 and 102_3 illuminating source conversion unit 120 with rotation angles. The rotation angles may change with the focusing power or the position of the first principal plane of the adjustable condenser lens. Accordingly, condenser lens 110 may be an anti-rotation condenser lens that may be configured to keep the rotation angles unchanged while the focusing power of condenser lens 110 is changed. In some embodiments, condenser lens 110 may be an adjustable anti-rotation condenser lens, in which the rotation angles do not change when the focusing power and the position of the first principal plane of condenser lens 110 are varied.

Electron beam tool 40 may comprise pre-beamlet forming mechanism 172. In some embodiments, electron source 101 may be configured to emit primary electrons and form a primary electron beam 102. In some embodiments, gun aperture plate 171 may be configured to block off peripheral electrons of primary electron beam 102 to reduce the Coulomb effect. In some embodiments, pre-beamlet-forming mechanism 172 further cuts the peripheral electrons of primary electron beam 102 to further reduce the Coulomb effect. Primary-electron beam 102 may be trimmed into three primary electron beamlets 102_1, 102_2, and 102_3 (or any other number of beamlets) after passing through pre-beamlet forming mechanism 172. Electron source 101, gun aperture plate 171, pre-beamlet forming mechanism 172, and condenser lens 110 may be aligned with a primary optical axis 100_1 of electron beam tool 40.

Pre-beamlet forming mechanism 172 may comprise a Coulomb aperture array. A center aperture, also referred to herein as the on-axis aperture, of pre-beamlet-forming mechanism 172 and a central deflector of source conversion unit 120 may be aligned with primary optical axis 100_1 of electron beam tool 40. Pre-beamlet-forming mechanism 172 may be provided with a plurality of pre-trimming apertures (e.g., a Coulomb aperture array). In FIG. 2, the three beamlets 102_1, 102_2 and 102_3 are generated when primary electron beam 102 passes through the three pre-trimming apertures, and much of the remaining part of primary electron beam 102 is cut off. That is, pre-beamlet-forming mechanism 172 may trim much or most of the electrons from primary electron beam 102 that do not form the three beamlets 102_1, 102_2 and 102_3. Pre-beamlet-forming mechanism 172 may cut off electrons that will ultimately not be used to form probe spots 102_1S, 102_2S and 102_3S before primary electron beam 102 enters source conversion unit 120. In some embodiments, a gun aperture plate 171 may be provided close to electron source 101 to cut off electrons at an early stage, while pre-beamlet forming mechanism 172 may be also provided to further cut off electrons around a plurality of beamlets. Although FIG. 2 demonstrates three apertures of pre-beamlet forming mechanism 172, it is appreciated that there may be any number of apertures, as appropriate.

In some embodiments, pre-beamlet forming mechanism 172 may be placed below condenser lens 110. Placing pre-beamlet forming mechanism 172 closer to electron source 101 may more effectively reduce the Coulomb effect. In some embodiments, gun aperture plate 171 may be omitted when pre-beamlet forming mechanism 172 is able to be located sufficiently close to source 101 while still being manufacturable.

Objective lens 131 may be configured to focus beamlets 102_1, 102_2, and 102_3 onto a sample 1 for inspection and can form three probe spots 102_1s, 102_2s, and 102_3s on surface of sample 1. Gun aperture plate 171 can block off peripheral electrons of primary electron beam 102 not in use to reduce Coulomb interaction effects. Coulomb interaction effects can enlarge the size of each of probe spots 102_1s, 102_2s, and 102_3s, and therefore deteriorate inspection resolution.

Beam separator 160 may be a beam separator of Wien filter type comprising an electrostatic deflector generating an electrostatic dipole field E1 and a magnetic dipole field B1 (both of which are not shown in FIG. 2). If they are applied, the force exerted by electrostatic dipole field E1 on an electron of beamlets 102_1, 102_2, and 102_3 is equal in magnitude and opposite in direction to the force exerted on the electron by magnetic dipole field B1. Beamlets 102_1, 102_2, and 102_3 can therefore pass straight through beam separator 160 with zero deflection angles.

Deflection scanning unit 132 can deflect beamlets 102_1, 102_2, and 102_3 to scan probe spots 102_1s, 102_2s, and 102_3s over three small scanned areas in a section of the surface of sample 1. In response to incidence of beamlets 102_1, 102_2, and 102_3 at probe spots 102_1s, 102_2s, and 102_3s, three secondary electron beams 102_1se, 102_2se, and 102_3se may be emitted from sample 1. Each of secondary electron beams 102_1se, 102_2se, and 102_3se can comprise electrons with a distribution of energies including secondary electrons (energies ≤50 eV) and back-scattered electrons (energies between 50 eV and landing energies of beamlets 102_1, 102_2, and 102_3). Beam separator 160 can direct secondary electron beams 102_1se, 102_2se, and 102_3se towards secondary imaging system 150. Secondary imaging system 150 can focus secondary electron beams 102_1se, 102_2se, and 102_3se onto detection elements 1401, 1402, and 1403 of electron detection device 140. Detection elements 140_1, 140_2, and 140_3 can detect corresponding secondary electron beams 102_1se, 102_2se, and 102_3se and generate corresponding signals that are sent to controller 50 or a signal processing system (not shown), e.g., to construct images of the corresponding scanned areas of sample 1.

In FIG. 2, three secondary electron beams 102_1se, 102_2se, and 102_3se respectively generated by three probe spots 102_1S, 102_2S, and 102_3S, travel upward towards electron source 101 along primary optical axis 100_1, pass through objective lens 131 and deflection scanning unit 132 in succession. The three secondary electron beams 102_1se, 102_2se and 102_3se are diverted by beam separator 160 (such as a Wien Filter) to enter secondary imaging system 150 along secondary optical axis 150_1 thereof. Secondary imaging system 150 focuses the three secondary electron beams 102_1se~102_3se onto electron detection device 140 which comprises three detection elements 140_1, 140_2, and 140_3. Therefore, electron detection device 140 can simultaneously generate the images of the three scanned regions scanned by the three probe spots 102_1S, 102_2S and 102_3S, respectively. In some embodiments, electron detection device 140 and secondary imaging system 150 form one detection unit (not shown). In some embodiments, the electron optics elements on the paths of secondary electron beams such as, but not limited to, objective lens 131, deflection scanning unit 132, beam separator 160, secondary imaging system 150 and electron detection device 140, may form one detection system.

In some embodiments, controller 50 may comprise an image processing system that includes an image acquirer (not shown) and a storage (not shown). The image acquirer may comprise one or more processors. For example, the image acquirer may comprise a computer, server, mainframe host, terminals, personal computer, any kind of mobile computing devices, and the like, or a combination thereof. The image acquirer may be communicatively coupled to electron detection device 140 of apparatus 40 through a medium such as an electrical conductor, optical fiber cable, portable storage media, IR, Bluetooth, internet, wireless network, wireless radio, among others, or a combination thereof. In some embodiments, the image acquirer may receive a signal from electron detection device 140 and may construct an image. The image acquirer may thus acquire images of sample 1. The image acquirer may also perform various post-processing functions, such as generating contours, superimposing indicators on an acquired image, and the like. The image acquirer may be configured to perform adjustments of brightness and contrast, etc. of acquired images. In some embodiments, the storage may be a storage medium such as a hard disk, flash drive, cloud storage, random access memory (RAM), other types of computer readable memory, and the like. The storage may be coupled with the image acquirer and may be used for saving scanned raw image data as original images, and post-processed images.

In some embodiments, the image acquirer may acquire one or more images of a sample based on one or more imaging signals received from electron detection device 140. An imaging signal may correspond to a scanning operation for conducting charged particle imaging. An acquired image may be a single image comprising a plurality of imaging areas or may involve multiple images. The single image may be stored in the storage. The single image may be an original image that may be divided into a plurality of regions. Each of the regions may comprise one imaging area containing a feature of sample 1. The acquired images may comprise multiple images of a single imaging area of sample 1 sampled multiple times over a time sequence or may comprise multiple images of different imaging areas of sample 1. The multiple images may be stored in the storage. In some embodiments, controller 50 may be configured to perform image processing steps with the multiple images of the same location of sample 1.

In some embodiments, controller 50 may include measurement circuitries (e.g., analog-to-digital converters) to obtain a distribution of the detected secondary electrons. The electron distribution data collected during a detection time window, in combination with corresponding scan path data of each of primary beamlets 102_1, 102_2, and 102_3 incident on the wafer surface, can be used to reconstruct images of the wafer structures under inspection. The reconstructed images can be used to reveal various features of the internal or external structures of sample 1, and thereby can be used to reveal any defects that may exist in the wafer.

In some embodiments, controller 50 may control a motorized stage (not shown) to move sample 1 during inspection. In some embodiments, controller 50 may enable the motorized stage to move sample 1 in a direction continuously at a constant speed. In other embodiments, controller 50 may enable the motorized stage to change the speed of the movement of sample 1 over time depending on the steps of scanning process. In some embodiments, controller 50 may adjust a configuration of primary projection optical system 130 or secondary imaging system 150 based on images of secondary electron beams 102_1se, 102_2se, and 102_3se.

Although FIG. 2 shows that electron beam tool 40 uses three primary electron beams, it is appreciated that electron beam tool 40 may use two or more number of primary electron beams. The present disclosure does not limit the number of primary electron beams used in apparatus 40.

Figure 3A:
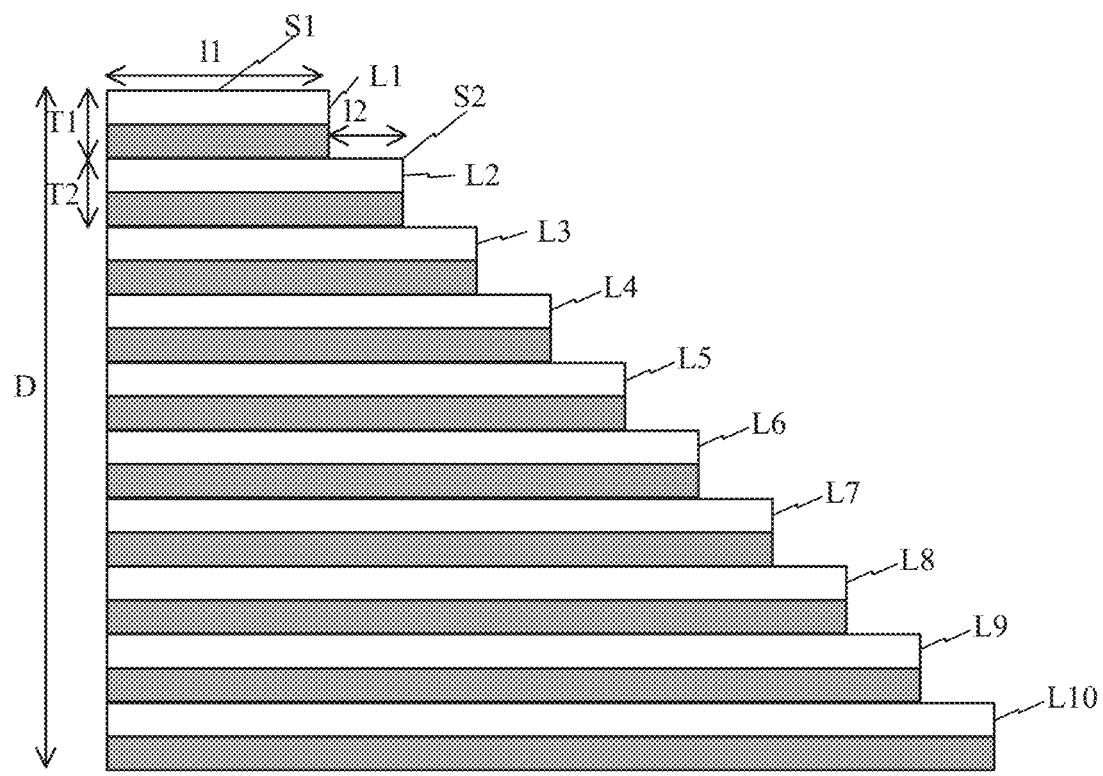
FIG. 3A is a cross sectional view of an example multi-layered structure, consistent with some embodiments of the present disclosure.

Reference is now made to FIG. 3A, which is a cross sectional view of an example multi-layered structure in a sample, consistent with embodiments of the present disclosure. FIG. 3A illustrates a sideview of a multi-layered structure 300 having multiple stacked layers L. In this disclosure, a multi-layered structure can include, for example, a staircase structure comprising multiple layers stacked in a Z-direction that intersects a plane (e.g., X-Y plane) for taking an inspection image and at least one layer except the top layer is exposed when viewed from top. For example, multi-layered structure 300 in FIG. 3A comprises 10 layers L1 to L10 stacked as a staircase from top to bottom. First layer L1 has a first exposed surface S1 that is exposed and of which length is indicated as I1 and a second layer L2 has a second exposed surface S2 that is not covered by first layer L1 and of which length is indicated as I2. Similarly, each of third to tenth layers L3 to L10 has its own exposed surface that is not covered by the layer stacked thereon. As shown in FIG. 3A, each layer L1 to L10 has a thickness T. For example, first layer L1's thickness is indicated as T1 and second layer L2's thickness is indicated as T2. In this example, multi-layered structure 300 can have a depth D corresponding to a sum of each thickness T of first to tenth layers L1 and L10. In some embodiments, stacked layers L1 to L10 can have different thicknesses with respect to each other.

Figure 3B:
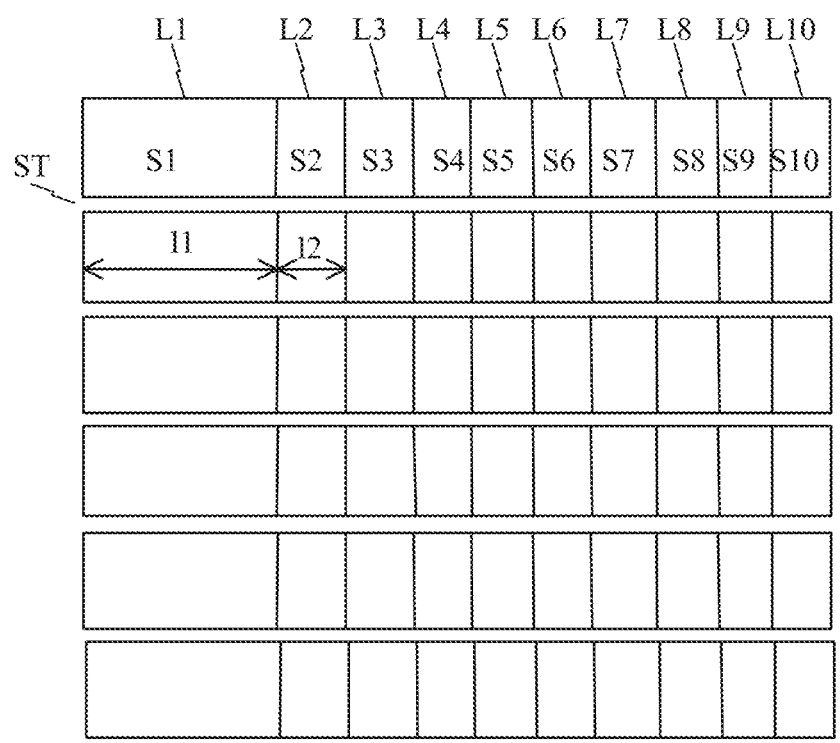
FIG. 3B is a top view of an example multi-layered structure of FIG. 3A.

FIG. 3B is a top view of multi-layered structure 300 of FIG. 3A. In some embodiments, as shown in FIG. 3B, multi-layered structure 300 may comprise a slit trench ST formed therein in a length direction (e.g., left to right direction in FIG. 3B). As shown in FIG. 3B, when viewed from top, at least portions (e.g., exposed surfaces S2 to S10) of layers in addition to the top layer (e.g., L1) are seen. Therefore, in order to obtain a clearer image for the entire multi-layered structure 300, an inspection tool's focal depth should be deep enough to cover the bottom layer (e.g., L10) as well as the top layer (e.g., L1). However, for multi-layered structures, it is challenging to obtain in-focus inspection images because of a limited focus depth of an inspection tool. In some embodiments, multi-layered structure 300 shown in FIG. 3B can be included in a field of view (FOV) of an inspection tool. When a focus depth of an inspection tool is smaller than depth D of multi-layered structure 300, the inspection tool may not be able to take a clear and in-focus inspection image for the entire multi-layered structure 300. This prohibits robust inspection or metrology measurement for the multi-layered structure 300.

For illustration purposes only, it is assumed that a focal depth of the inspection tool ranges from −2.5 micrometer (μm) to +2.5 μm from a focal point, depth D of the multi-layered structure 300 is 10 μm, and each of the layers L1 to L10 has a thickness 1 μm. Under this assumption, as an example, if an inspection image for multi-layered structure 300 is taken by setting a focal point of an inspection tool to be placed on a top surface of first layer L1, the inspection image may be defocused for the area that is out of the focal depth. For example, the inspection image can have a clear image for first layer L1, second layer L2, and third layer L3 each of which are within the focal depth. However, the inspection image may have a defocused image for fourth to tenth layers L4 to L10 because they are out of the focal depth of the inspection tool. As another example, if an inspection image for the multi-layered structure 300 is taken by setting a focal point of an inspection tool to be placed on a top surface of fifth layer L5, the inspection image may be defocused for the area that is out of the focal depth. For example, the inspection image can have a clear image for third layer to seventh layer L3 to L7 each of which are within the focal depth. However, the inspection image may have a defocused image for first layer L1, second layer L2, and eight to tenth layers L8 to L10 because they are out of the focal depth of the inspection tool.

The above issue can be worse as the technology advances. For example, multiple stacking layers are used for Vertical NAND flash memory, with some manufacturers stacking as many as 32 layers, and the number of stacked layers grows larger to improve storage capacity and density, with some manufacturers working towards being able to stack 64, 128, and even more layers. However, as explained with respect to FIG. 3A and FIG. 3B, as a depth of a multi-layered structure becomes deeper, out of focus inspection images seriously impact the ability to inspect the multi-layered structures. Resultantly, it is challenging to take a focused inspection image for a multi-layered structure within a field of view, let alone take accurate measurements from the inspection image. Embodiments of the present disclosure can provide techniques to obtain an in-focus image for all patterns of a multi-layered structure of which depth is deeper than a focal depth of an inspection tool such that accurate metrology can be performed based on an inspection image.

Figure 4:
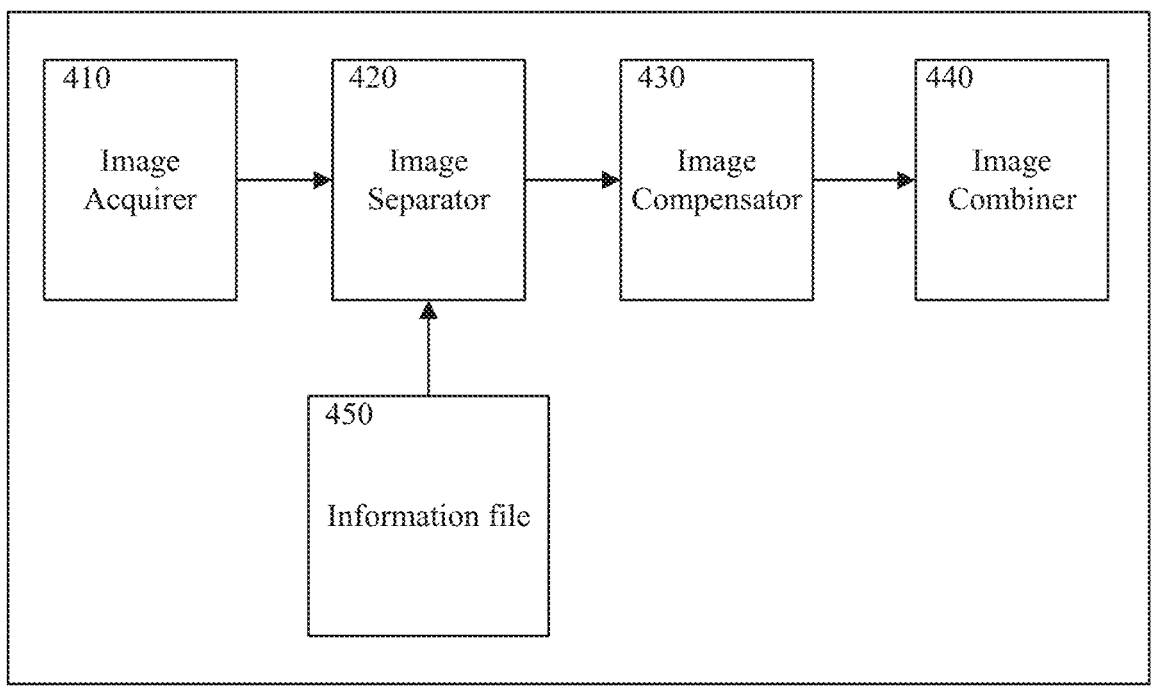
FIG. 4 is a block diagram of an example image enhancement apparatus, consistent with some embodiments of the present disclosure.

FIG. 4 is a block diagram of an example image enhancement apparatus, consistent with embodiments of the present disclosure. It is appreciated that in various embodiments image enhancement apparatus 400 may be part of or may be separate from a charged-particle beam inspection system (e.g., electron beam inspection system 100 of FIG. 1). In some embodiments, image enhancement apparatus 400 may be part of controller 50 and may include an image acquirer, measurement circuitry, or storage, or the like. In some embodiments, image enhancement apparatus 400 may comprise an image processing system and may include an image acquirer, storage, or the like.

As illustrated in FIG. 4, image enhancement apparatus 400 may include an image acquirer 410, an image separator 420, image compensator 430, image combiner 440, and information file 450.

According to embodiments of the present disclosure, image acquirer 410 can acquire a plurality of inspection images of a sample to be inspected. For illustration purposes, a sample comprising multi-layered structure 300 illustrated in FIGS. 3A and 3B will be used as an example of a sample to be inspected. In some embodiments, inspection image acquirer 410 may generate inspection images based on a detection signal from electron detection device 140 of electron beam tool 40. In some embodiments, inspection image acquirer 410 may be part of or may be separate from an image acquirer included in controller 50. In some embodiments, inspection image acquirer 410 may obtain inspection images generated by an image acquirer included in controller 50. In some embodiments, inspection image acquirer 410 may obtain inspection images from a storage device or system storing the inspection image.

Figure 5:
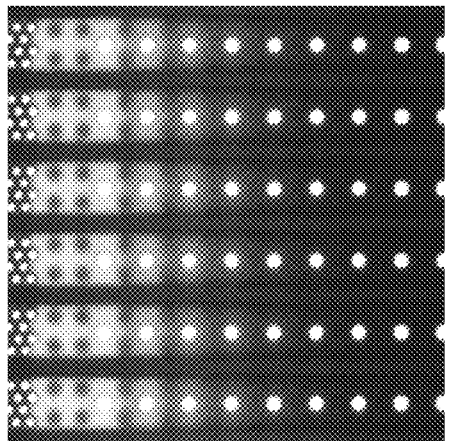
FIG. 5 is an example set of inspection images, consistent with some embodiments of the present disclosure.
Figure 5:
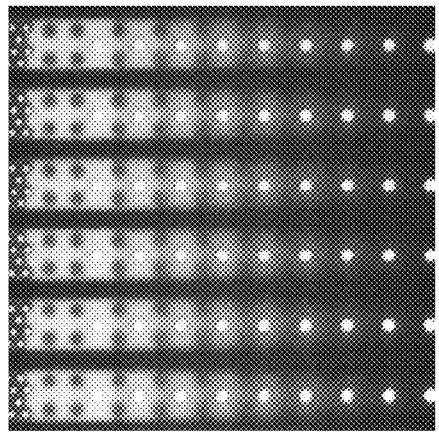
Figure 5:

In some embodiments, a plurality of inspection images can be taken for a same region of a sample. For example, a plurality of inspection images can be taken for a region having multi-layered structure 300 shown in FIG. 3B. In some embodiments, a plurality of inspection images can be taken with different focal points in a depth direction (e.g., Z-direction). FIG. 5 is an example set of inspection images 500 taken with different focal points, consistent with embodiments of the present disclosure. As shown in FIG. 5, second inspection image 502 has a clearer image for intermediate layers than first inspection image 501 because the focal point for image 502 is closer to the middle of the multi-layered structure in the Z dimension, while first inspection image 501 has a clearer image for upper layers than second inspection image because the focal point for image 501 is closer to the top of the multi-layered structure. For example, a first inspection image 501 can be taken by setting a focal point of an inspection tool to a first focal point nearer to the top of the multi-layered structure and a second inspection image 502 can be taken by setting a focal point of an inspection tool to a second focal point that is different from the first focal point in a depth (i.e., Z) direction. Similarly, a plurality of inspection images can be taken by changing a focal point by a predetermined amount from that of a previous inspection image.

Acquiring a plurality of inspection images by changing a focal point will be explained with respect to FIG. 5. For illustration purposes only, the same assumption discussed with respect to FIG. 3B can be used. For example, it is assumed that a focal depth of the inspection tool ranges from −2.5 μm to +2.5 μm from a focal point, depth D of the multi-layered structure 300 is 10 μm, and each of the layers L1 to L10 has a thickness 1 μm. Under this assumption, as an example, a first inspection image 501 can be taken by setting a first focal point of an inspection tool to be placed on a top surface of first layer L1. A second inspection image 502 can be taken by increasing a focal point of an inspection tool by a predetermined amount from the first focal point. In this example, second inspection image 502 can be taken by setting a second focal point by increasing a first focal point by 4 μm, which makes the second focal point to be placed on a top surface of fifth layer L5. Similarly, a third inspection image (not shown) can be taken by increasing a focal point of an inspection tool by a predetermined amount from the second focal point. In some embodiments, the same predetermined amount between a first point and a second focal point can be used for a predetermined amount between a second focal point and a third focal point. For example, a third inspection image can be taken by setting a third focal point by increasing a second focal point by 4 μm, which makes the third focal point to be placed on a top surface of ninth layer L9. In this example, in-focus image for the bottom layer L10 can be taken by a third inspection image and thus a fourth inspection image may not be taken.

In some embodiments, a predetermined amount for a focal point gap between two consecutive inspection images can be determined to be equal to or less than a focal depth of the inspection tool in order to take at least one in-focus image for each of the stacked layers L1 to L10. In some embodiments, a predetermined amount can be set such that at least a portion of in-focus areas of neighboring inspection images can overlap to improve an image quality because an inspection image can be blurred a bit even within a focal depth. In the above example, because the predetermined amount (e.g., 4 μm) for a focal point gap is smaller than a focal depth (e.g., 5 μm), a portion of in-focus areas of neighboring inspection images overlaps. For example, first inspection image 501 can have an in-focus image for first to third layers L1 and L3, second inspection image 502 can have an in-focus image for third to seventh layers L3 to L7, similarly, and a third inspection image can have an in-focus image for seventh layers to tenth layers L7 to L10. In some embodiments, a predetermined amount can be set to be equal to a focal depth such that each layer has an in-focus image in only one inspection image. For example, if the predetermined amount is set to 5 μm in the above example, first inspection image 501 can have an in-focus image for first to third layers L1 and L3 in that a first focal point is positioned on a top surface of first layer L1, second inspection image 502 can have an in-focus image for fourth to eighth layers L4 to L8 in that the second focal point is positioned on a top surface of sixth layer L6, etc. As such, all layers can have at least one in-focus image from the three inspection images according to some embodiments of the present disclosure. While an image acquiring process is explained with respect to three inspection images, it will be appreciated that any number of inspection images can be used according to a focal depth of an inspection system, a depth of a three dimensional structure, resolution requirements, etc.

In FIG. 5, a plurality of inspection images 500 can be obtained by a charged-particle beam inspection system (e.g., electron beam inspection system 100 of FIG. 1). For example, a plurality of inspection images 500 can be electron beam images generated based on an electron detection signal from electron detection element 140. In some embodiments, a focal point of an inspection tool can be a focal point of a charged-particle beam. In some embodiments, a focal point can be adjusted by controlling an objective lens of the charged-particle system (e.g., objective lens 131 in FIG. 2). In some embodiments, a focal point can be adjusted by using a component located upstream of a focusing component of the objective lens of the charged-particle system (e.g., an anode of a charged-particle source). In some embodiments, a focal point can also be adjusted by changing landing energies of the charged-particle beam. For example, a focal point can be adjusted by changing voltages applied to a plate located downstream of the objective lens and in the vicinity of a wafer. A focal point may also be adjusted by adjusting a position of the stage in Z-axis.

Referring back to FIG. 4, image separator 420 is configured to separate layers on an inspection image acquired from image acquirer 410. In some embodiments, image separator 420 can separate layers on a plurality of inspection images. In some embodiments, image separator 420 can separate layers on an inspection image by referring to reference images corresponding to the layers. An inspection images 500 can capture features/patterns on a sample, such as various size of vias, contacts, slopes, etc. As shown in FIG. 5, first inspection image 501 and second inspection image 520 comprises features/patterns that represent features/patterns present on a corresponding sample. According to some embodiments of the present disclosure, image separator 420 can separate layers on an inspection image based on patterns/features and their positions on the inspection image and those on corresponding reference images.

According to embodiments of the present disclosure, image separator 420 can use information from information file 450 to separate layers. Information file 450 can contain reference images corresponding to layers (e.g., first to tenth layers L1 to L10). Information file 450 may be any means of storing information, such as a file, a set of files, a database, a set of databases, etc. Information file 450 can, for example, include reference images of layers for an inspection image. In some embodiments, a reference image contained in information file 450 can be a ground truth image of a corresponding test region. A ground truth image can include a raw image of a wafer or die containing the corresponding pattern or can include a ground truth wafer map measured from a wafer or die containing the corresponding pattern, among others. In some embodiments, a reference image can comprise a wafer design layout of a corresponding layer of a sample, such as in Graphic Database System (GDS) format, Graphic Database System II (GDS II) format, an Open Artwork System Interchange Standard (OASIS) format, a Caltech Intermediate Format (CIF), etc. The wafer design layout may be based on a pattern layout for constructing the wafer. In some embodiments, a reference image, among others, may comprise feature information stored in a binary file format representing planar geometric shapes, text, and other information related to wafer design layout. The wafer design layout may correspond to one or more photolithography masks or reticles used to transfer features from the photolithography masks or reticles to a wafer.

Figure 6:
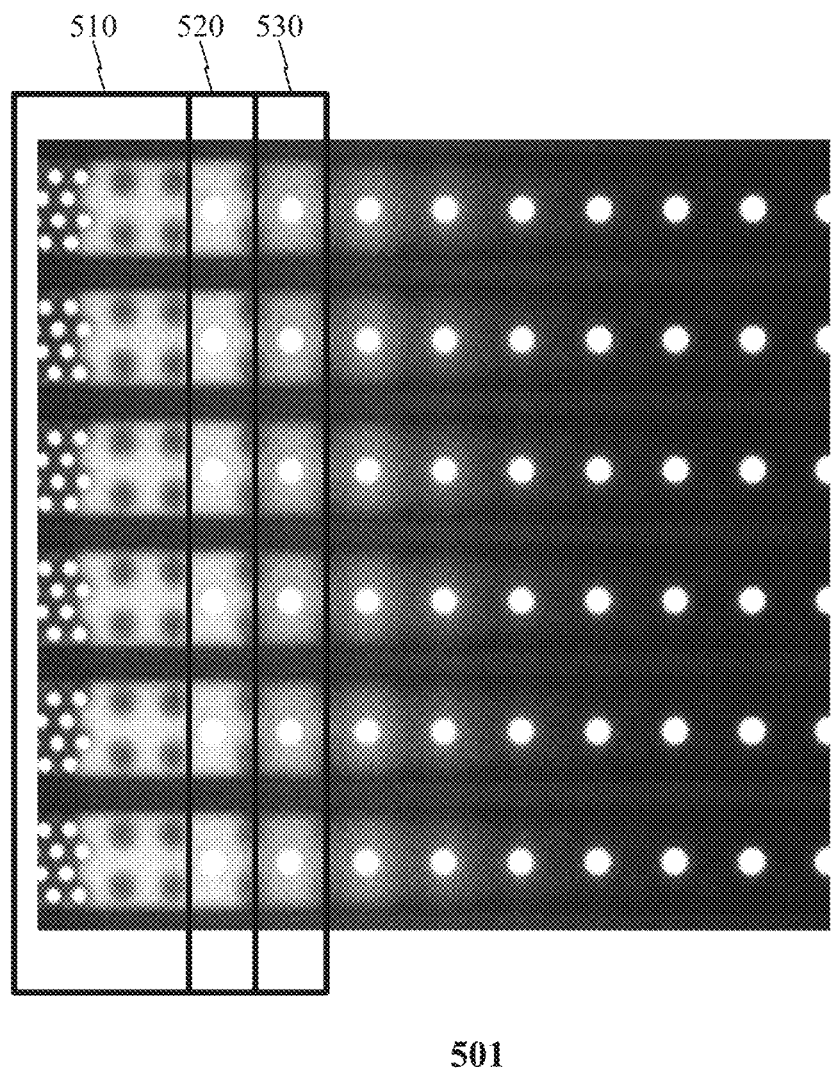
FIG. 6 illustrates an example of separating an inspection image, consistent with some embodiments of the present disclosure.

A process for separating an inspection image will be explained referring to FIG. 6, which illustrates an example of separating first inspection image 501, consistent with embodiments of the present disclosure. As shown in FIG. 6, inspection image 501 is separated per layer referring to a corresponding reference image. FIG. 6 illustrates three segments 510, 520, and 530 separated from first inspection image 501 and corresponding to first layer L1, second layer L2, and third layer L3 of FIGS. 3A and 3B. In some embodiments, separating an inspection image can be performed based on information of reference images of layers (e.g., L1 to L10). For example, by comparing patterns or features on inspection image 501 and a reference image or images (e.g., such as represented via a GDS database), where each image may contain any or all of layers L1 to L10, it can be determined which portion of inspection image 501 corresponds to which patterns or features in the reference image(s).

In some embodiments, based on a feature location comparison between an inspection image and a corresponding reference image(s), a segment corresponding to a certain layer can be determined. For example, first segment 510 can be determined to correspond to first layer L1, second segment 520 can be determined to correspond to second layer L2, and third segment can be determined to correspond to third layer L3. As another example, a comparison of a SEM image of a wafer and GDS data, which includes reference image data that represents the mask data used to manufacture the wafer, can determine that a particular polygon in the GDS data that represents a particular piece of a certain layer (e.g., first layer L1) can be matched with a particular feature in the SEM image, and the particular feature in the SEM image can resultantly be determined to be the particular piece of the layer. Further, the location in the Z dimension of the feature in the SEM image can be determined, as the depth of all features of the layer in the multi-layer stack is the same as a result of the manufacturing process, and is known. As a result of the comparison between the SEM image and the GDS data, each of the features in the SEM image can be matched to a corresponding feature in the GDS data, and the depth of each of the features in the SEM image can be determined based on characteristics of GDS data of the feature to which it corresponds.

In some embodiments, separating an inspection image can be performed for an area having a certain level of sharpness because it is difficult to find a corresponding layer based on comparison of an inspection image and reference images if it is too blurry. In an example, image separation may be performed only for an in-focus image area. FIG. 6 illustrates that three segments are separated from inspection image 501 and separation is not performed for the rest of inspection image 501. Similarly, second inspection image 502 can also be separated for an area having a certain level of sharpness. For example, segments corresponding to third to seventh layers L3 to L7 that are within an in-focus range can be separated from second inspection image 502. Similarly, such separation can be performed for each inspection image acquired from inspection image acquirer 410. In some embodiments, image separation can be performed for a broader area than an in-focus range as long as a certain level of sharpness presents.

Referring back to FIG. 4, image compensator 430 is configured to update an inspection image per segment. For example, a segment separated from an inspection image by inspection image separator 420 can be updated or revised based on a corresponding reference image. In some embodiments, segments may not be clear enough or may still be too blurry although they are taken within an in-focused range, and thus segments can be updated or revised referring to corresponding reference images. For example, first segment 510 corresponding to first layer L1 can be updated based on a corresponding first reference image, and second segment 520 corresponding to second layer L2 can be updated based on a corresponding second reference image. In some embodiments, a segment can be updated based on a blurriness degree of the segment image. In some embodiments, a blurriness degree per layer can be determined based on a corresponding reference image. For example, a point spread function (PSF) can be used to estimate a blurriness degree for a segment based on a corresponding reference image. Estimating a point spread function for a segment will be explained below with respect to first segment 510 of first layer L1 for illustration purposes.

A relationship between a blurred image b and a clear image (or an original object plane) x corresponding to the blurred image b can be expressed as a convolutional integral equation as follows:

$$b(u,v)=\iint a(u,s,v,t) \times (s,t)dsdt+e(u,v) \quad \text{(Equation 1)}$$

Here, the function a represents a point spread function describing how much a point object in a clear image x is blurred in blurred image b. Point spread function a can be considered as an impulse response of a focused optical system, e.g., an inspection tool. The function e represents image noise, e.g., generated by an optical system, manipulation error, low signal to noise ratio, etc. Generally, noise e is not known but some statistical information may be known from prior inspection histories. In some embodiments, while noise e may not be significant, it may not be ignored. Variables s and t represent coordinates of clear image x, while variables u and v represent coordinates of blurred image b. As shown in Equation 1, blurred image b can be obtained by performing a convolutional integral operation between clear image x and point spread function a and by adding noise e.

Equation 1 including a convolutional operation can be formulated as a matrix-vector equation as follows:

$$B=AX+E \quad \text{(Equation 2)}$$

Here, A represents a point spread function in a matrix form, which is built from point spread function a in Equation 1. E represents noise in a matrix form. X and B represent a clear image (or an original object plane) and a blurred image in a matrix form, respectively. Thereby, a convolution operation in Equation 1 becomes the matrix product operation in Equation 2.

In some embodiments, image compensator 430 can estimate point spread function A for first segment 510 based on a first reference image corresponding to first segment 510. When estimating a point spread function for first segment 510, first segment 510 of inspection image 501 can be used as blurred image B and a first reference image for first segment 510 can be used as clear image X. However, because Equation 2 includes noise E factor, point spread function A cannot be solved through a linear algebra problem. In some embodiments, point spread function A can be obtained by inferring elements of point spread function A using a machine learning network.

In some embodiments, a machine learning network can be configured to infer elements of point spread function A with supervised learning based on Equation 2. For example, a machine learning network can be configured to learn elements of point spread function A under a condition that elements of blurred image B are known to the machine learning network. In some embodiments, a machine learning network can be configured to learn elements of point spread function A by using a first reference image as input data (e.g., for clear image X). For example, feature shape and location information of a first reference image can be used as input data (e.g., for clear image X) to infer elements of point spread function A. In some embodiments, noise E can also be inferred during inferring point spread function A. When noise E is already known, noise E can also be given to the machine learning network to infer point spread function A.

In some embodiments, point spread function A may be independent of position in the object plane (e.g., original object plane X) and thus point spread function A can be used for an entire layer. For example, point spread function A obtained for a portion of first layer L1 can be used for the entire first layer L1 as long as the first layer L1 has the same height for the entire layer L1. In some embodiments, point spread function A is plane specific and thus point spread function A can be obtained for each layer. For example, a first point spread function $A_1$ can be obtained for first segment 510 corresponding to first layer L1, a second point spread function $A_2$ can be obtained for second segment 520 corresponding to second layer L2, and a third point spread function $A_3$ can be obtained for third segment 530 corresponding to third layer L3. Similarly, for each segment from other inspection images, e.g., second inspection image 502, point spread function A can be estimated. Because focal points are different when taking first inspection images 501 and second inspection images 502, point spread function A for a segment corresponding to a certain layer in first inspection image 501 may not be equal to point spread function A for a segment corresponding to the certain layer in second inspection image. For example, point spread function A for third segment 530 in first inspection image 501 may be different from point spread function A for a segment in second inspection image 502. Therefore, although point spread function A for a segment corresponding to a certain layer in one inspection image has already obtained, point spread function A for a segment corresponding to the certain layer in another inspection image can be obtained.

Image compensator 430 can update an inspection image based on the estimated point spread function A. In some embodiments, image compensator 430 can update an inspection image to generate a clear image based on the point spread function A. In some embodiments, image compensation can be performed based on Equation 2 that can be transformed as follows:

$$X = A^{-1}(B-E) \tag{Equation 3}$$

As discussed, blurred image B is already known and elements of noise E are known or have been inferred when inferring point spread function A. Therefore, as shown in Equation 3, clear image X can be obtained by multiplying inverse matrix $A^{-1}$ of point spread function A to a difference between blurred image B and noise E.

Figure 7:
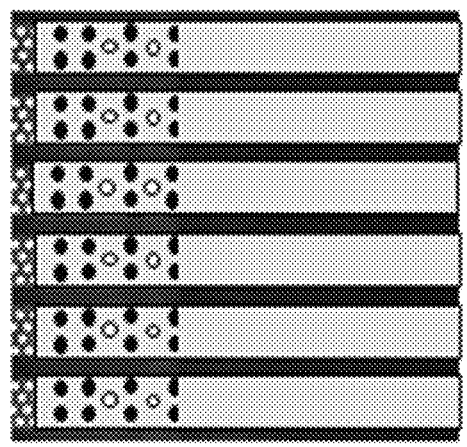
FIG. 7 illustrates an example of combining inspection images, consistent with some embodiments of the present disclosure.
Figure 7:
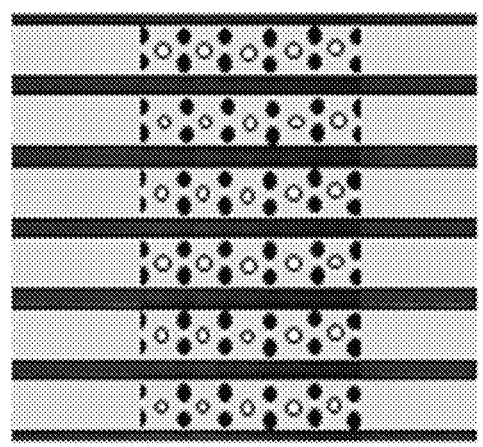
Figure 7:
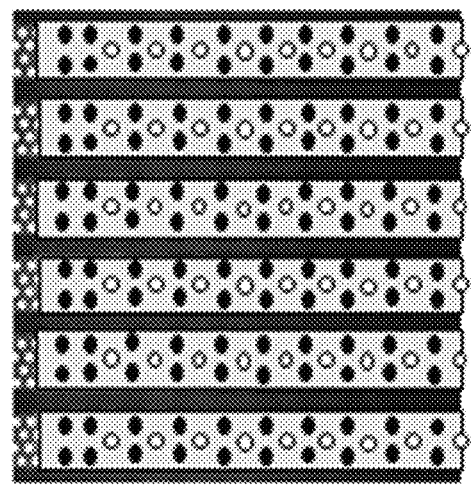

In some embodiments, inspection image update can be performed on a per layer basis. Referring back to FIG. 6, for example, first segment 510 of first inspection image 501 can be updated based on point spread function A obtained for first layer L1, second segment 520 of first inspection image 501 can be updated based on point spread function A obtained for second layer L2, and third segment 530 of first inspection image 501 can be updated based on point spread function A obtained for third layer L3. A first updated inspection image 701 of first inspection image 501 is illustrated in FIG. 7. First updated inspection image 701 may comprise the updated segments, e.g., corresponding to first to third layers L1 to L3 as shown in FIG. 7, Similarly, segments separated from second inspection image 502 and other inspection images can be updated. A second updated inspection image 702 of second inspection image 502 is illustrated in FIG. 7. Second updated inspection image 702 may comprise the updated segments, e.g., corresponding to third to seventh layers L3 to L7 as shown in FIG. 7. Similarly, other updated inspection images (not shown) can be generated.

As discussed above, point spread function A can be determined specific to certain conditions, e.g., including a difference between a layer height and a focal point height with which a corresponding inspection image of the layer is taken, an inspection tool used, etc. In some embodiments, point spread function A can be stored with corresponding conditions such that the point spread function A can be loaded and used to enhance inspection images when the inspection images are taken with the same conditions, which can improve throughput.

Referring back to FIG. 4, image combiner 440 is configured to combine updated images to generate a combined image 700 corresponding to an image taken by image acquirer 410. FIG. 7 illustrates an example of combining inspection images, consistent with embodiments of the present disclosure. As shown in FIG. 7, a plurality of updated inspection images 701 and 702 by image compensator 430 are combined to generate a clearer image of the entire field of view. Image combining of a plurality of updated inspection images 701 and 702 can be expressed as follows:

$$I_f = I_1 * W_1 + I_2 * W_2 + \ldots + I_n * W_n \tag{Equation 4}$$

Here, $I_1$ to $I_n$ represent a plurality of updated inspection images to be combined. For example, $I_1$ represents first updated inspection image 701, $I_2$ can represent second updated inspection image 702, and similarly $I_n$ represents $n^{th}$ updated inspection images. According to embodiments of the present disclosure, a plurality of updated inspection images are associated with the same region (e.g., multi-layered structure 300) of a sample. $I_f$ represents a combined image of updated inspection images $I_1$ to $I_n$. $W_1$ to $W_n$ represent weights of corresponding updated inspection images $I_1$ to $I_n$ and can be determined to reflect each pixel's fusion rate of updated inspection images.

In FIG. 7, among a plurality of updated inspection images 701 and 702, only first updated inspection image 701 comprises segments for first layer L1 and second layer L2 and thus first weight $W_1$ can have value 1 for elements corresponding to first layer L1 and second layer L2 and other weights $W_2$ to $W_n$ can have value 0 for elements corresponding to first layer L1 and second layer L2.

In FIG. 7, only two inspection images 701 and 702 comprise a segment for third layer L3 and thus a fusion rate between first updated inspection image 701 and second updated inspection image 702 can be determined that facilitates or enables generation of a clearer image for third layer L3. In some embodiments, pixels for third layer L3 in combined image $I_f$ can have an average value between first updated inspection image 701 and second updated inspection image 702. For example, first weight $W_1$ and second weight $W_2$ can have value ½ for elements corresponding to third layer L3 and other weights $W_3$ to $W_n$ can have value 0 for elements corresponding to third layer L3. In some embodiments, different fusion rate between first updated inspection image $I_1$ and second updated inspection image $I_2$ can be used for pixels corresponding to third layer L3. A fusion rate between multiple updated inspection images can be determined based on various factors, e.g., including a difference between a certain layer's height and a focal point height with which a corresponding inspection image is taken. For example, a first distance of third layer L3 from a focal point of first inspection image 501 in a depth direction can be determined and a second distance of third layer L3 from a focal point of second inspection image 502 in a depth direction can be determined. If the first distance is greater than the second distance, first weight $W_1$ can have greater values for elements corresponding to third layer L3 than those of second weight $W_2$, or if the first distance is smaller than the second distance, first weight $W_1$ can have smaller values for elements corresponding to third layer L3 than those of second weight $W_2$.

Determining an optimum fusion rate can be complex and thus, in some embodiments, a fusion rate for pixels can be determined with a machine learning network by taking into account various factors. Similarly, for all layers, a fusion rate can be determined and combined to generate a combined image for the entire field of view of a sample. While a method of determining a fusion rate between two inspection images to generate a clearer image for a certain layer has been explained, it will be appreciated that the present disclosure can be applied to determining a fusion rate for three or more inspection images to generate a clearer image for a certain layer.

According to embodiments of the present disclosure, a technique for obtaining an in-focus inspection image for a multi-layered structure of which depth is greater than a focus depth of an inspection system can be provided. In some embodiments, a plurality of inspection images taken for a multi-layered structure with different focal points can be compensated on a per layer basis based on corresponding GDS information and can be combined to generate a clear inspection image for the multi-layered structure within a field of view. The present disclosure can help in providing a more accurate SEM image and thus enables detecting defects of a sample with higher accuracy and efficiency.

Figure 8:
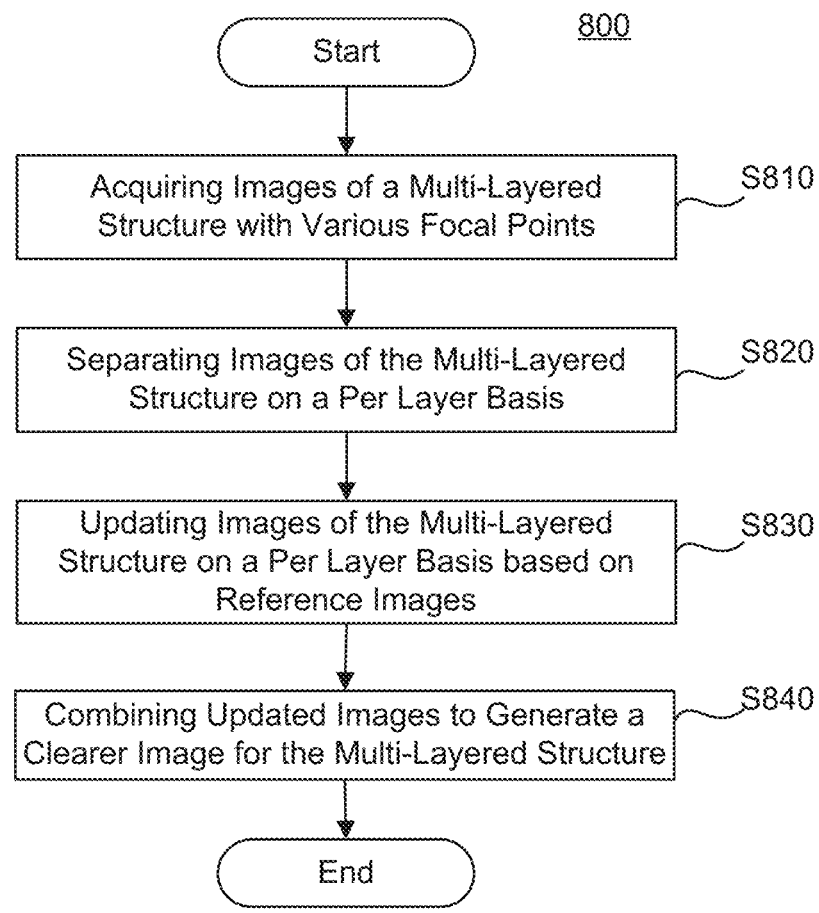
FIG. 8 is a process flowchart representing an example method for enhancing an image, consistent with some embodiments of the present disclosure.

FIG. 8 is a process flowchart representing an example method for enhancing an image, consistent with embodiments of the present disclosure. For illustrative purposes, a method for enhancing an image will be described referring to image enhancing apparatus 400 of FIG. 4. It is appreciated that in some embodiments a method for enhancing an image can be performed in or, directly or indirectly, by controller 50.

In step S810, a plurality of inspection images (e.g., 501, 502 of FIG. 5) of a sample can be obtained. Step S810 can be performed by, for example, image acquirer 410, among others. In some embodiments, a plurality of inspection images can be taken for a same region of a sample. For example, a plurality of inspection images can be taken for a region having multi-layered structure 300 shown in FIG. 3B. In some embodiments, a plurality of inspection images can be taken with different focal points in a depth direction (e.g., Z-direction). FIG. 5 is an example set of inspection images 500 taken with different focal points, consistent with embodiments of the present disclosure. For example, a first inspection image 501 can be taken by setting a focal point of an inspection tool to a first focal point and a second inspection image 501 can be taken by setting a focal point of an inspection tool to a second focal point that is different from the first focal point in a depth direction. Similarly, a plurality of inspection images can be taken by changing a focal point by a predetermined amount from that of a previous inspection image.

In some embodiments, a predetermined amount for a focal point gap between two consecutive inspection images can be determined to be equal to or less than a focal depth of the inspection tool in order to take at least one in-focus image for each of the stacked layers L1 to L10. In some embodiments, a predetermined amount can be set such that at least a portion of in-focus areas of neighboring inspection images can overlap to improve an image quality because an inspection image can be blurred a bit even within a focal depth.

In step S820, inspection images taken in step S810 can be separated per layer. Step S820 can be performed by, for example, image separator 420, among others. In some embodiments, layers on an inspection image can be separated by referring to reference images corresponding to the layers. According to some embodiments of the present disclosure, layers on an inspection image can be separated based on patterns/features and their positions on the inspection image and those on corresponding reference images. In some embodiments, separating inspection images can be performed based on information of reference images of layers (e.g., L1 to L10). For example, by comparing patterns or features on inspection image 501 and a reference image for each of layers L1 to L10, it can be determined which portion of inspection image 501 corresponds to which portion of a reference image. In some embodiments, based on feature location comparison between an inspection image and a corresponding reference image, a segment corresponding to a certain layer can be determined. In some embodiments, separating an inspection image can be performed for an area having a certain level of sharpness because it is difficult to find a corresponding layer based on comparison of an inspection image and reference images if it is too blurry. For example, image separation may be difficult to perform for an out-of-focus image area. A process for separating an inspection image has been explained with respect to FIG. 6, and thus explanation of a process for separating an inspection image will be omitted here for simplicity.

In step S830, an inspection image can be updated per segment. Step S830 can be performed by, for example, image compensator 430, among others. For example, a segment separated in step S820 from an inspection image can be updated or revised based on a corresponding reference image. In some embodiments, segments may not be clear enough or may still be blurry although they are taken within an in-focused range and thus segments can be updated or revised referring to corresponding reference images. For example, first segment 510 corresponding to first layer L1 can be updated based on a corresponding first reference image, and second segment 520 corresponding to second layer L2 can be updated based on a corresponding second reference image. In some embodiments, a segment can be updated based on a blurriness degree of the segment image. In some embodiments, a blurriness degree per layer can be determined based on a corresponding reference image. For example, a point spread function (PSF) can be used to estimate a blurriness degree for a segment based on a corresponding reference image.

In some embodiments, point spread function A for a segment can be estimated based on a reference image corresponding to the segment and Equation 2. In some embodiments, a machine learning network can be configured to infer elements of point spread function A with supervised learning based on Equation 2. For example, a machine learning network can be configured to learn elements of point spread function A under a condition that elements of blurred image B are known to the machine learning network. In some embodiments, a machine learning network can be configured to learn elements of point spread function A by using a reference image as input data (e.g., for clear image X). For example, feature shape and location information of a first reference image can be used as input data (e.g., for clear image X) to infer elements of point spread function A. In some embodiments, noise E can also be inferred during inferring point spread function A. When noise E is already known, noise E can also be given to the machine learning network to infer point spread function A.

In some embodiments, point spread function A may be independent of position in the object plane (e.g., original object plane X) and thus point spread function A can be used for an entire layer. For example, point spread function A obtained for a portion of first layer L1 can be used for the entire first layer L1 as long as the first layer L1 has the same height for the entire layer L1. In some embodiments, point spread function A is plane specific and thus point spread function A can be obtained for each layer. For example, a first point spread function A1 can be obtained for first segment 510 corresponding to first layer L1, a second point spread function A2 can be obtained for second segment 520 corresponding to second layer L2, and a third point spread function A3 can be obtained for third segment 530 corresponding to third layer L3. Similarly, for each segment from other inspection images, e.g., second inspection image 502, point spread function A can be estimated. Because focal points are different when taking first inspection images 501 and second inspection images 502, point spread function A for a segment corresponding to a certain layer in first inspection image 501 may not be equal to point spread function A for a segment corresponding to the certain layer in second inspection image. For example, point spread function A for third segment 530 in first inspection image 501 may be different from point spread function A for a segment in second inspection image 502. Therefore, although point spread function A for a segment corresponding to a certain layer in one inspection image has already obtained, point spread function A for a segment corresponding to the certain layer in another inspection image can be obtained.

In step S830, inspection image can be updated to generate a clear image based on the estimated point spread functions A and equation 3. In some embodiments, updating inspection image can be performed on a per layer basis. Referring back to FIG. 6, for example, first segment 510 of first inspection image 501 can be updated based on point spread function A obtained for first layer L1, second segment 520 of first inspection image 501 can be updated based on point spread function A obtained for second layer L2, and third segment 530 of first inspection image 501 can be updated based on point spread function A obtained for third layer L3. Similarly, other updated inspection images (not shown) can be generated.

As discussed above, point spread function A can be determined specific to certain conditions, e.g., including a difference between a layer height and a focal point height with which a corresponding inspection image of the layer is taken, an inspection tool used, etc. In some embodiments, point spread function A can be stored with corresponding conditions such that the point spread function A can be loaded and used to enhance inspection images when the inspection images are taken with the same conditions, which can improve throughput.

In step S840, updated images can be combined to generate a combined image 700 corresponding to images acquired in Step S810. S840 can be performed by, for example, image combiner 440, among others. FIG. 7 illustrates an example of combining inspection images, consistent with embodiments of the present disclosure. As shown in FIG. 7, a plurality of updated inspection images 701 and 702 are combined to generate a clear image of the entire field of view of the multi-layered structure. In some embodiments, when only one updated image comprises a segment corresponding to a certain layer, the one updated image can be used for the certain layer in a combined image 700. In some embodiments, when two or more updated inspection images comprise a segment corresponding to a certain layer, the two or more updated inspection images can be combined to generate a clearer image for the certain layer. In some embodiments, a clearer image for the certain layer can be generated with an average pixel value of the two or more updated inspection images. In some embodiments, a clearer image for the certain layer can be generated according to a certain fusion rate between the two or more updated inspection images. In some embodiments, a fusion rate between multiple updated inspection images can be determined based on various factors, e.g., including a difference between certain layer's height and a focal point height with which a corresponding inspection image is taken. For example, a fusion rate can be determined based on a first distance of a certain layer from a focal point of first inspection image in a depth direction and a second distance of the certain layer from a focal point of second inspection image in a depth direction. Determining an optimum fusion rate can be complex and thus, in some embodiments, a fusion rate for pixels can be determined with a machine learning network by taking into account various factors. Similarly, for all layers, a fusion rate can be determined and combined to generate a combined image for the entire field of view or a sample.

Aspects of the present disclosure are set out in the following numbered clauses:

1. A method for enhancing an inspection image in a charged-particle beam inspection system, the method comprising:

acquiring a first image and a second image of multiple stacked layers of a sample that are taken with a first focal point and a second focal point, respectively;

associating a first segment of the first image with a first layer among the multiple stacked layers and associating a second segment of the second image with a second layer among the multiple stacked layers;

estimating a first blurriness degree of the first segment based on a first reference image corresponding to the first layer and estimating a second blurriness degree of the second segment based on a second reference image;

updating the first segment according to the first blurriness degree and updating the second segment according to the second blurriness degree; and combining the updated first segment and the updated second segment to generate a combined image including the first layer and the second layer.

2. The method of clause 1, wherein associating the first segment of the first image with the first layer among the multiple stacked layers and associating the second segment of the second image with the second layer among the multiple stacked layers comprises comparing features on the first image and the second image with features on the first reference image and the second reference image.

3. The method of clause 1 or 2, wherein the first blurriness degree is estimated as a point spread function between the first segment and the first reference image.

4. The method of any one of clauses 1-3, further comprising:

associating a third segment of the first image with the second layer;

estimating a third blurriness degree of the third segment based on the second reference image; and updating the third segment according to the third blurriness degree, wherein the third blurriness degree is different from the first blurriness degree.

5. The method of clause 4, wherein combining the updated first segment and the updated second segment comprises:

combining the updated first segment, the updated second segment, and the updated third segment to generate a combined image including the first layer and the second layer, wherein a portion of the combined image corresponding to the second layer is generated based on the updated second segment and the updated third segment.

6. The method of clause 4, further comprising determining a combining ratio between the updated second segment and the updated third segment based on a first height difference between the second layer and the first focal point and a second height difference between the second layer and the second focal point.

7. The method of any one of clauses 1-6, wherein the first reference image and the second reference image are in Graphic Database System (GDS) format, Graphic Database System II (GDS II) format, Open Artwork System Interchange Standard (OASIS) format, or Caltech Intermediate Format (CIF).

8. The method of clause 7, wherein each of the first reference image and the second reference image are a portion of a reference image corresponding to the sample.

9. An image enhancing apparatus comprising:

a memory storing a set of instructions; and at least one processor configured to execute the set of instructions to cause the apparatus to perform:

acquiring a first image and a second image of multiple stacked layers of a sample that are taken with a first focal point and a second focal point, respectively;

associating a first segment of the first image with a first layer among the multiple stacked layers and associating a second segment of the second image with a second layer among the multiple stacked layers;

estimating a first blurriness degree of the first segment based on a first reference image corresponding to the first layer and estimating a second blurriness degree of the second segment based on a second reference image;

updating the first segment according to the first blurriness degree and updating the second segment according to the second blurriness degree; and combining the updated first segment and the updated second segment to generate a combined image including the first layer and the second layer.

10. The apparatus of clause 9, wherein associating the first segment of the first image with the first layer among the multiple stacked layers and associating the second segment of the second image with the second layer among the multiple stacked layers comprises comparing features on the first image and the second image with features on the first reference image and the second reference image.

11. The apparatus of clause 9 or 10, wherein the first blurriness degree is estimated as a point spread function between the first segment and the first reference image.

12. The apparatus of any one of clauses 9-11, wherein the at least one processor is configured to execute the set of instructions to cause the apparatus to further perform:
associating a third segment of the first image with the second layer;
estimating a third blurriness degree of the third segment based on the second reference image; and
updating the third segment according to the third blurriness degree, wherein the third blurriness degree is different from the first blurriness degree.

13. The apparatus of clause 12, wherein combining the updated first segment and the updated second segment comprises:
combining the updated first segment, the updated second segment, and the updated third segment to generate a combined image including the first layer and the second layer,
wherein a portion of the combined image corresponding to the second layer is generated based on the updated second segment and the updated third segment.

14. The apparatus of clause 12, further comprising determining a combining ratio between the updated second segment and the updated third segment based on a first height difference between the second layer and the first focal point and a second height difference between the second layer and the second focal point.

15. The apparatus of any one of clauses 9-14, wherein the first reference image and the second reference image are in Graphic Database System (GDS) format, Graphic Database System II (GDS II) format, Open Artwork System Interchange Standard (OASIS) format, or Caltech Intermediate Format (CIF).

16. A non-transitory computer readable medium that stores a set of instructions that is executable by at least one processor of a computing device to perform a method for enhancing an image, the method comprising:
acquiring a first image and a second image of multiple stacked layers of a sample that are taken with a first focal point and a second focal point, respectively;

associating a first segment of the first image with a first layer among the multiple stacked layers and associating a second segment of the second image with a second layer among the multiple stacked layers;

estimating a first blurriness degree of the first segment based on a first reference image corresponding to the first layer and estimating a second blurriness degree of the second segment based on a second reference image;

updating the first segment according to the first blurriness degree and updating the second segment according to the second blurriness degree; and combining the updated first segment and the updated second segment to generate a combined image including the first layer and the second layer.

17. The computer readable medium of clause 16, wherein associating the first segment of the first image with the first layer among the multiple stacked layers and associating the second segment of the second image with the second layer among the multiple stacked layers comprises comparing features on the first image and the second image with features on the first reference image and the second reference image.

18. The computer readable medium of clause 16 or 17, wherein the first blurriness degree is estimated as a point spread function between the first segment and the first reference image.

19. The computer readable medium of any one of clauses 16-18, wherein the set of instructions that is executable by at least one processor of the computing device to further perform:
associating a third segment of the first image with the second layer;
estimating a third blurriness degree of the third segment based on the second reference image; and
updating the third segment according to the third blurriness degree, wherein the third blurriness degree is different from the first blurriness degree.

20. The computer readable medium of clause 19, wherein combining the updated first segment and the updated second segment comprises:
combining the updated first segment, the updated second segment, and the updated third segment to generate a combined image including the first layer and the second layer,
wherein a portion of the combined image corresponding to the second layer is generated based on the updated second segment and the updated third segment.

21. The computer readable medium of clause 19, further comprising determining a combining ratio between the updated second segment and the updated third segment based on a first height difference between the second layer and the first focal point and a second height difference between the second layer and the second focal point.

22. The computer readable medium of any one of clauses 16-21, wherein the first reference image and the second reference image are in Graphic Database System (GDS) format, Graphic Database System II (GDS II) format, Open Artwork System Interchange Standard (OASIS) format, or Caltech Intermediate Format (CIF).

23. A method for enhancing an inspection image in a charged-particle beam inspection system, the method comprising:
acquiring a first image and a second image of multiple stacked layers of a sample that are taken with a first focal point and a second focal point, respectively;

associating a first segment of the first image with a first layer among the multiple stacked layers and associating a second segment of the second image with a second layer among the multiple stacked layers;

updating the first segment based on a first reference image corresponding to the first layer and updating the second segment based on a second reference image corresponding to the second layer; and combining the updated first segment and the updated second segment to generate a combined image including the first layer and the second layer.

24. The method of clause 23, wherein updating the first segment comprises estimating a first point spread function corresponding to the first layer based on the first reference image and updating the first segment based on the estimated first point spread function.

25. The method of clause 23 or 24, further comprising:
associating a third segment of the first image with the second layer; and
updating the third segment based on the second reference image, wherein the third blurriness degree is different from the first blurriness degree.

26. The method of clause 25, wherein combining the updated first segment and the updated second segment comprises:
combining the updated first segment, the updated second segment, and the updated third segment to generate a combined image including the first layer and the second layer,
wherein a portion of the combined image corresponding to the second layer is generated based on the updated second segment and the updated third segment.

27. The method of clause 26, further comprising determining a combining ratio between the updated second segment and the updated third segment based on a first height difference between the second layer and the first focal point and a second height difference between the second layer and the second focal point.

28. A method of generating an image of a sample, the method comprising:
obtaining multiple images of a location on the sample, each of the multiple images being obtained at a different focal point;
determining correlations between features of the multiple images and features of an associated reference image;
determining a depth of each of the features of the multiple images based on the correlations and layer information of the associated reference image;
selecting one image of the multiple images from which to obtain a selected image for each of the features on the multiple images; and
creating an image of the location by combining each of the selected image.

29. The method of clause 28, further comprising:
updating the selected image based on the associated reference image.

30. The method of clause 29, wherein updating the selected image comprises estimating a point spread function corresponding to the corresponding feature based on the depth of the corresponding feature, a focal point at which the selected image is obtained, and the associated reference image.

31. The method of any one of clauses 28-30, wherein the associated reference image is in Graphic Database System (GDS) format, Graphic Database System II (GDS II) format, Open Artwork System Interchange Standard (OASIS) format, or Caltech Intermediate Format (CIF).

A non-transitory computer readable medium may be provided that stores instructions for a processor of a controller (e.g., controller 50 of FIG. 1) to carry out, among other things, image inspection, image acquisition, stage positioning, beam focusing, electric field adjustment, beam bending, condenser lens adjusting, activating charged-particle source, beam deflecting, and method 800. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The descriptions above are intended to be illustrative, not limiting. Thus, it will be apparent to one skilled in the art that modifications may be made as described without departing from the scope of the claims set out below.

The invention claimed is:

1. A method for enhancing an inspection image in a charged-particle beam inspection system, the method comprising:
acquiring a first image and a second image of multiple stacked layers of a sample that are taken with a first focal point and a second focal point, respectively;
associating a first segment of the first image with a first layer among the multiple stacked layers and associating a second segment of the second image with a second layer among the multiple stacked layers;
estimating a first blurriness degree of the first segment based on a first reference image corresponding to the first layer and estimating a second blurriness degree of the second segment based on a second reference image;
updating the first segment according to the first blurriness degree and updating the second segment according to the second blurriness degree; and
combining the updated first segment and the updated second segment to generate a combined image including the first layer and the second layer.

2. An image enhancing apparatus comprising:
a memory storing a set of instructions; and
at least one processor configured to execute the set of instructions to cause the apparatus to perform:
acquiring a first image and a second image of multiple stacked layers of a sample that are taken with a first focal point and a second focal point, respectively;
associating a first segment of the first image with a first layer among the multiple stacked layers and associating a second segment of the second image with a second layer among the multiple stacked layers;
estimating a first blurriness degree of the first segment based on a first reference image corresponding to the first layer and estimating a second blurriness degree of the second segment based on a second reference image;

updating the first segment according to the first blurriness degree and updating the second segment according to the second blurriness degree; and combining the updated first segment and the updated second segment to generate a combined image including the first layer and the second layer.

3. The apparatus of claim 2, wherein associating the first segment of the first image with the first layer among the multiple stacked layers and associating the second segment of the second image with the second layer among the multiple stacked layers comprises comparing features on the first image and the second image with features on the first reference image and the second reference image.

4. The apparatus of claim 2, wherein the first blurriness degree is estimated as a point spread function between the first segment and the first reference image.

5. The apparatus of claim 2, wherein the at least one processor is configured to execute the set of instructions to cause the apparatus to further perform:

associating a third segment of the first image with the second layer;

estimating a third blurriness degree of the third segment based on the second reference image; and updating the third segment according to the third blurriness degree, wherein the third blurriness degree is different from the first blurriness degree.

6. The apparatus of claim 5, wherein combining the updated first segment and the updated second segment comprises:

combining the updated first segment, the updated second segment, and the updated third segment to generate a combined image including the first layer and the second layer, wherein a portion of the combined image corresponding to the second layer is generated based on the updated second segment and the updated third segment.

7. The apparatus of claim 5, further comprising determining a combining ratio between the updated second segment and the updated third segment based on a first height difference between the second layer and the first focal point and a second height difference between the second layer and the second focal point.

8. The apparatus of claim 2, wherein the first reference image and the second reference image are in Graphic Database System (GDS) format, Graphic Database System II (GDS II) format, Open Artwork System Interchange Standard (OASIS) format, or Caltech Intermediate Format (CIF).

9. A non-transitory computer readable medium that stores a set of instructions that is executable by at least one processor of a computing device to perform a method for enhancing an image, the method comprising:

acquiring a first image and a second image of multiple stacked layers of a sample that are taken with a first focal point and a second focal point, respectively;

associating a first segment of the first image with a first layer among the multiple stacked layers and associating a second segment of the second image with a second layer among the multiple stacked layers;

estimating a first blurriness degree of the first segment based on a first reference image corresponding to the first layer and estimating a second blurriness degree of the second segment based on a second reference image;

updating the first segment according to the first blurriness degree and updating the second segment according to the second blurriness degree; and combining the updated first segment and the updated second segment to generate a combined image including the first layer and the second layer.

10. The computer readable medium of claim 9, wherein associating the first segment of the first image with the first layer among the multiple stacked layers and associating the second segment of the second image with the second layer among the multiple stacked layers comprises comparing features on the first image and the second image with features on the first reference image and the second reference image.

11. The computer readable medium of claim 9, wherein the first blurriness degree is estimated as a point spread function between the first segment and the first reference image.

12. The computer readable medium of claim 9, wherein the set of instructions that is executable by at least one processor of the computing device to further perform:

associating a third segment of the first image with the second layer;

estimating a third blurriness degree of the third segment based on the second reference image; and updating the third segment according to the third blurriness degree, wherein the third blurriness degree is different from the first blurriness degree.

13. The computer readable medium of claim 12, wherein combining the updated first segment and the updated second segment comprises:

combining the updated first segment, the updated second segment, and the updated third segment to generate a combined image including the first layer and the second layer, wherein a portion of the combined image corresponding to the second layer is generated based on the updated second segment and the updated third segment.

14. The computer readable medium of claim 12, further comprising determining a combining ratio between the updated second segment and the updated third segment based on a first height difference between the second layer and the first focal point and a second height difference between the second layer and the second focal point.

15. The computer readable medium of claim 9, wherein the first reference image and the second reference image are in Graphic Database System (GDS) format, Graphic Database System II (GDS II) format, Open Artwork System Interchange Standard (OASIS) format, or Caltech Intermediate Format (CIF).

* * * * *